March 31. 1925.                                                          1,531,903
H. L. CUMMINS
PITTER
Filed May 31, 1923
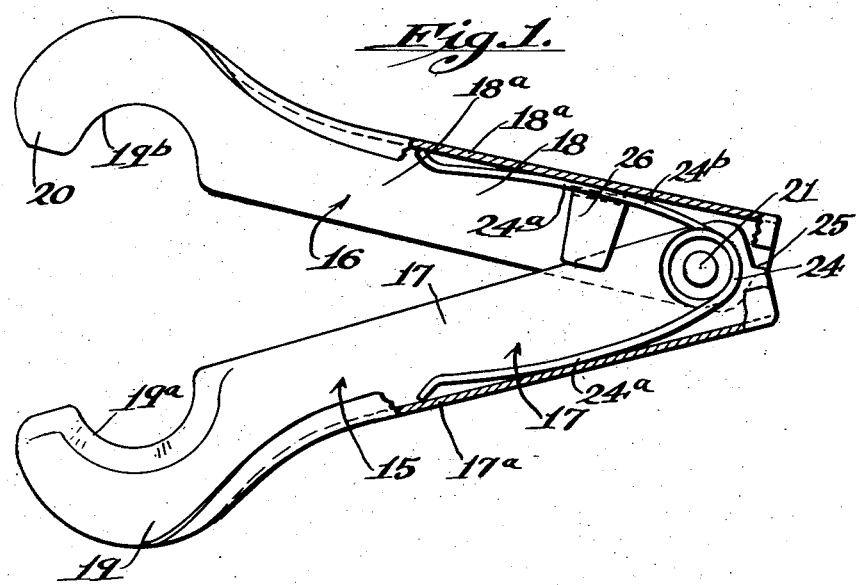
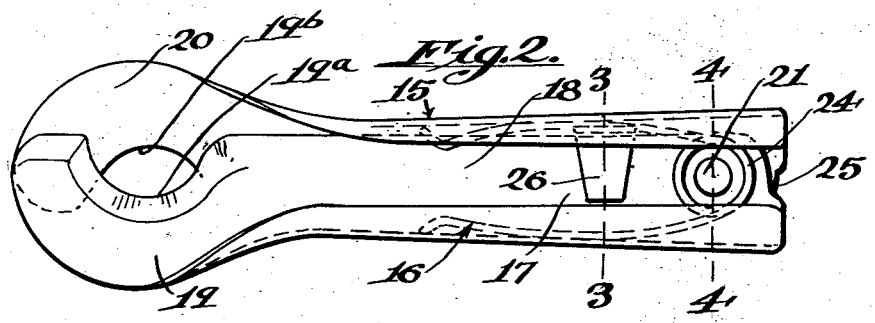
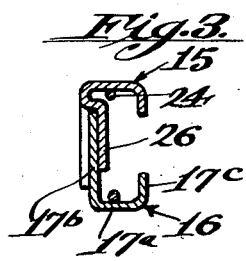
Witness.
W. Hall.
Inventor:
HERBERT L. CUMMINS.
By Hazard and Miller
Attorneys Patented Mar. 31, 1925.

1,531,903

UNITED STATES PATENT OFFICE.

HERBERT L. CUMMINS, OF LOS ANGELES, CALIFORNIA, ASSIGNOR TO JAMES B. WHIPPLE, OF LOS ANGELES, CALIFORNIA.

PITTER.

Application filed May 31, 1923. Serial No. 642,565.

*To all whom it may concern:*

Be it known that I, HERBERT L. CUMMINS, a citizen of the United States, residing at Los Angeles, in the county of Los Angeles and State of California, have invented new and useful Improvements in Pitters, of which the following is a specification.

My invention relates to fruit pitters of the character embodied in my copending application serial No. 584,274 filed Aug. 25, 1922, Patent No. 1,455,323, dated May 15, 1923, and a purpose of my present invention is the provision of a fruit pitter of extremely simple, durable, and inexpensive construction which includes a pair of pivoted arms formed from two sheets of metal bent to provide complemental shanks and blades, and with one of the shanks formed with means which engages the other shank to maintain the shanks in definite relation thus insuring the proper coaction between the cutting edges of the blades.

Although I have herein shown and described only one form of fruit pitter embodying my invention, it is to be understood that various changes and modifications may be made herein without departing from the spirit of the invention and the spirit and scope of the appended claims.

In the accompanying drawings,

Fig. 1 is a view showing in side elevation and partly in section one form of fruit pitter embodying my invention.

Fig. 2 is a view similar to Fig. 1 with the blades of the pitter in closed position.

Figs. 3 and 4 are sectional views taken on the lines 3—3 and 4—4 of Fig. 2.

Referring specifically to the drawings in which similar reference characters refer to similar parts in each of the views, my invention in its present embodiment comprises a pair of arms 15 and 16 including shank portions 17 and 18, and blade portions 19 and 20 formed on one end of the shank portions and shaped to provide arcuate cutting edges 19$^a$ and 19$^b$ respectively. Each arm is formed from a single length of material such as metal or the like bent longitudinally so that the shank portion 17 or 18 is of substantially L-shape in cross section. As clearly shown in Figs. 3 and 4, each shank portion 17 or 18 includes an intermediate portion 17$^a$ or 18$^a$, a relatively wide lip 17$^b$ or 18$^b$, and a relatively narrow lip 17$^c$ or 18$^c$. As shown in Fig. 2, the lips 17$^c$ and 18$^c$ taper in width toward the blades 19 and 20 and finally merge into the flat blades so as not to interfere with the passage of the blades into a piece of fruit. The lips 17$^b$ and 18$^b$ have sliding contact with each other, the two arms being pivotally connected by means of a pin 21 which as clearly shown in Fig. 4 is extended through suitable openings formed in the lips 17$^b$ and 18$^b$ and securely held therein by means of a head 22 formed on one end of the pin and a locking collar 23 arranged to confine the lips between the head and collar.

A coil spring 24 is arranged about the pin 21, and the ends of the spring are extended as indicated at 24$^a$ and 24$^b$ so as to repose within the shank portions 17 and 18 and between the lips of such portions. This spring serves to normally urge the arms to the expanded position shown in Fig. 1, and this position of the arms is defined by means of shoulders 25 (Fig. 2) formed on the vertical edges of the lips 17$^b$ and 18$^b$.

In the normal position of the arms 15 and 16, the blades 19 and 20 are separated to allow the insertion of a peach or other similar fruit between the blades whereupon by gripping the shank portions with the hand and forcing the arms together to the position shown in Fig. 2, the blades will be moved into overlapped relation to each other to penetrate the fruit and grip the pit, as will be understood. The movement of the arms to this active position is against the tension of the spring 24 so that when the arms are released, the spring will serve to return the arms to expanded position.

It is vital to the successful operation of the pitter that the blades 19 and 20 be mounted so that their cutting edges have intimate sliding contact in order that a clean cutting of the fruit be effected because should the cut be ragged the value of the fruit when subsequently canned or preserved is greatly depreciated. In order to secure this intimate sliding contact between the cutting edges of the blades, I provide a guiding lip 26 formed on the arm 18 by instriking a portion of the lip 18$^b$. As clearly shown in Fig. 3, the lip 26 is spaced with relation to the flange 18$^b$ so as to slidably receive therebetween the corresponding flange 17$^b$ of the arm 15. By this arrangement it will be see that the lip 26 serves to maintain the arms 15 and 16 in definite relation with respect to each other and in such relation that the cutting edges 19ª and 19ᵇ will at all times have intimate sliding contact.

It will be noticed that the construction of the arms 15 and 16 is such that the shank portions and blade portions can be formed in a single operation, that is, with a subsequent formation of the cutting edges of the blades. This permits of the manufacturing of the pitter at an extremely low cost while at the same time the pitter is extremely durable and efficient in effecting the pitting of fruit.

What I claim is:

1. A fruit pitter, comprising a pair of pivoted arms, said arms fitting side by side like a shear throughout their lengths, and forming a handle, and cutting blades on the arms, each arm being formed of a single sheet of material bent to form a shank and one blade.

2. A fruit pitter, comprising a pair of arms, said arms fitting side by side like a shear throughout their lengths, and forming a handle, each arm being formed of a single length of metal bent to provide a shank of substantially L-shape in cross section, and a flat blade of arcuate form, a pin pivotally connecting the arms, a coiled spring surrounding the pin between the arms and having its end contacting with the confronting sides of said shanks, and a lip formed on one of the shanks by instriking, said lip having sliding contact with the other shank for the purpose described.

3. A fruit pitter, comprising a pair of arms, said arms fitting side by side like a shear throughout their lengths, and forming a handle, each arm being formed of a single length of metal bent to provide a shank of substantially L-shape in cross section, and a flat blade of arcuate form, a pin pivotally connecting the arms, and a coiled spring surrounding the pin between the arms and having its ends contacting with the confronting sides of said shanks.

In testimony whereof I have signed my name to this specification.

HERBERT L. CUMMINS.